Sept. 27, 1955    R. C. DU BOIS    2,718,878
MOTOR HAVING A DIAPHRAGM ACTUATED BY FLUID PRESSURE
Filed Feb. 2, 1954    3 Sheets-Sheet 1
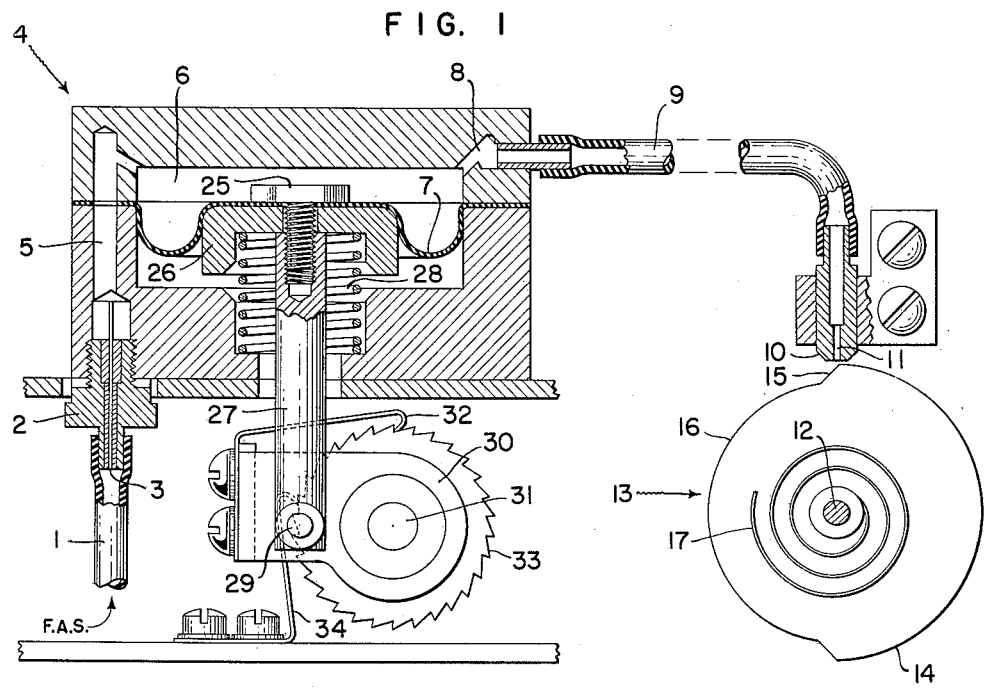
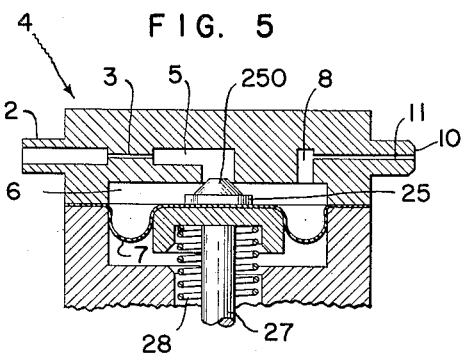
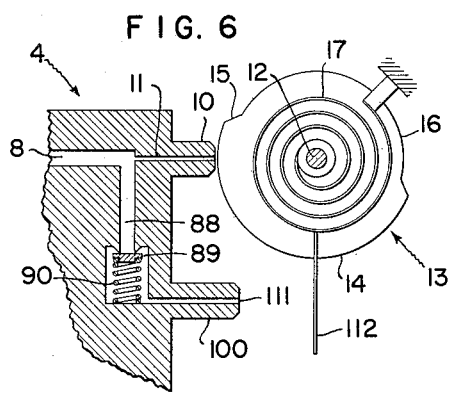
*INVENTOR.*
ROBERT CLARK DU BOIS
BY
*Arthur H. Swanson*
ATTORNEY.

Sept. 27, 1955 R. C. DU BOIS 2,718,878
MOTOR HAVING A DIAPHRAGM ACTUATED BY FLUID PRESSURE
Filed Feb. 2, 1954 3 Sheets-Sheet 2

INVENTOR.
ROBERT CLARK DU BOIS
BY Arthur H. Swanson
ATTORNEY.

Sept. 27, 1955 R. C. DU BOIS 2,718,878
MOTOR HAVING A DIAPHRAGM ACTUATED BY FLUID PRESSURE
Filed Feb. 2, 1954 3 Sheets-Sheet 3

INVENTOR.
ROBERT CLARK DU BOIS
BY Arthur H. Swanson
ATTORNEY.

United States Patent Office 2,718,878
Patented Sept. 27, 1955

2,718,878

MOTOR HAVING A DIAPHRAGM ACTUATED BY FLUID PRESSURE

Robert Clark Du Bois, Philadelphia, Pa., assignor to Minneapolis-Honeywell Regulator Company, Minneapolis, Minn., a corporation of Delaware Application February 2, 1954, Serial No. 407,793

9 Claims. (Cl. 121—48)

This invention relates to air-operated means for driving the record-receiving chart of a recorder. Such air-operated means may be used advantageously where the danger of explosion renders the use of electrically driven mechanisms hazardous.

One object of this invention is to provide an air-powered motor in which a spring-biased valve is used to regulate the flow of air through a nozzle and thus create a series of pressure pulses. These pulses are converted to a force by a diaphragm and are used by means of suitable gearing to provide the output from the mechanism. This power output can be very large, since it depends on the size of the diaphragm used. This high output power does not load the valve which constitutes an escapement. Therefore, high accuracy and low friction are attained.

It is a further object of this invention to provide an air-operated motor which is self-starting. This is achieved by providing the valve with one face which provides maximum pressure within the nozzle through which the jet of air escapes, a second face inclined at an angle to the axis of the jet issuing from the nozzle so that, when the jet impinges on the second face, the valve is rotated about its pivot against the bias supplied by a torsion spring, and a third face which provides minimum pressure within this nozzle.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a diagrammatic or schematic view with parts in longitudinal cross section, the various parts being all located in the same plane for the purpose of clarity;

Fig. 5 is a vertical cross section of a modification;

Fig. 6 is a vertical cross section of a second modification;

Figure 2:
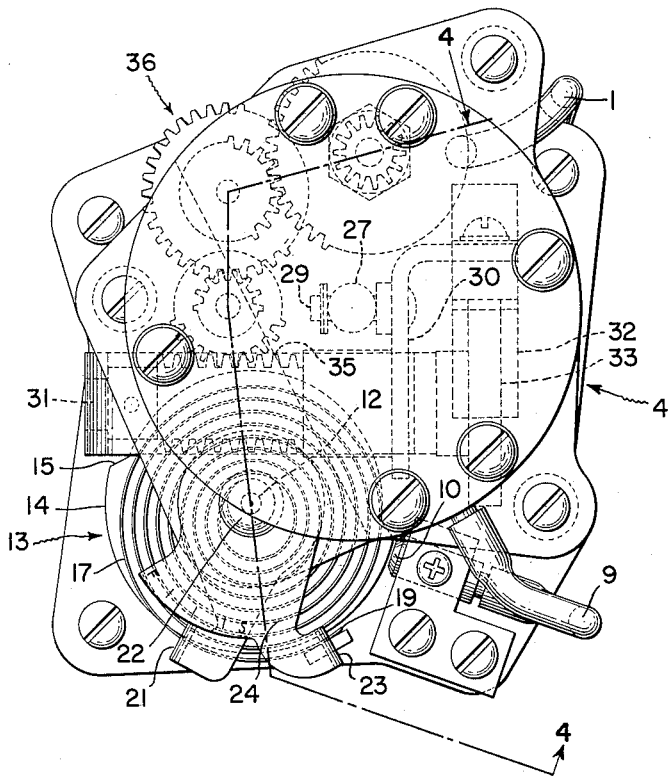
Fig. 2 is a top or plan view.

Referring to Fig. 1, tube 1 may be connected to any suitable source of compressed fluid, such as filtered air. This source is not shown herein but is indicated by the initials F. A. S. Tube 1 is connected to a second tube 2 which has a bore 3 of small cross section through it. This bore constitutes a restriction to the flow of fluid. The motor has a case, generally indicated at 4, containing a conduit 5 through which fluid is conducted from restriction 3 to a chamber 6 having a movable wall formed by a diaphragm 7 whose edges are clamped between two parts of the case 4 so that the rim of diaphragm is sealed to case 4. A second conduit 8 connects the chamber 6 to a second tube 9 which terminates in a nozzle 10 having a bore 11 of small cross section through it. Conduit 5, chamber 6, conduit 8, and the interior of second tube 9 form a closed passageway to which restriction 3 forms the inlet and from which bore 11 forms the outlet. The location of chamber 6, restriction 2, and bore 11 relative to each other is of no significance. The chamber 6, regardless of its changes in size, is so large relative to the size of restriction 3 and bore 11 that it makes no difference in which of the three following ways, these parts are connected together:

1. The restriction 3, the chamber 6, and the bore 11 in series, as in Fig. 1;
2. The restriction 3, the nozzles 110 and 210, and the chamber 6 in series, as in Fig. 8; and
3. The chamber 6, the restriction 3, and the bore 11 in series, not shown in the drawings.

Shaft 12 supports a valve 13 on it. Valve 13 is a disc-like cam and has a first face 14 which, when it is opposite the nozzle 10, causes maximum pressure in the bore 11 through the nozzle 10. At one end of face 14 is second face 15 which is inclined at an angle to the axis of the jet of air issuing through bore 11 of nozzle 10. Therefore, when the jet of air from nozzle 10 impinges on face 15 it tends to rotate in one direction valve 13 and shaft 12, which forms the pivot for valve 13. Valve 13 has a third face 16 which, when it is opposite to nozzle 10, causes a minimum pressure in the bore 11 in the nozzle 10.

A spiral, torsion, hair spring 17 biases valve 13 so that the interface between faces 14 and 15 is close to the axis of the jet of air issuing from nozzle 10 through bore 11. The end of first face 14 adjacent second face 15 substantially overlies bore 11 when the valve 13 is in its position of rest. When air is applied from chamber 6 to nozzle 10 and face 14 is opposite nozzle 10, the pressure in bore 11 is a maximum. This maximum pressure escapes between nozzle 10 and face 14 in a turbulent manner. These air waves engage face 15 and turn valve 13 in a clockwise direction as seen in Fig. 1 about its axis and against the bias of spring 17.

This turning brings face 16 opposite nozzle 10 and therefore drops the pressure in chamber 6 and nozzle 10 to a minimum. The bias of spring 17 increases, while the pressure of the air on face 15 decreases to that of the atmosphere. The air jet impinging on faces 14 and 16 has substantially no pressure component tending to turn valve 13.

When the bias of spring 17 has increased to a sufficient amount, this force turns valve 13 in the opposite or counterclockwise direction. The inertia of valve 13 carries face 15 past nozzle 10. When face 15 passes nozzle 10, going in a counterclockwise direction, valve 13 receives a turning movement in the retarding or undesired direction. However, the pressure of the jet issuing from nozzle 10 is at a minimum at this time so the retarding effect is small.

When face 14 is located opposite nozzle 10, the pressure in bore 11 of nozzle 10 and in chamber 6 rises to a maximum. The inertia of valve 13 also winds spring 17 in the opposite direction. When this opposing force in spring 17 overcomes the diminishing value of the inertia, the valve 13 is caused to rotate again in the opposite or clockwise direction as viewed in Fig. 1. This whole cycle repeats itself until interrupted.

Figure 4:
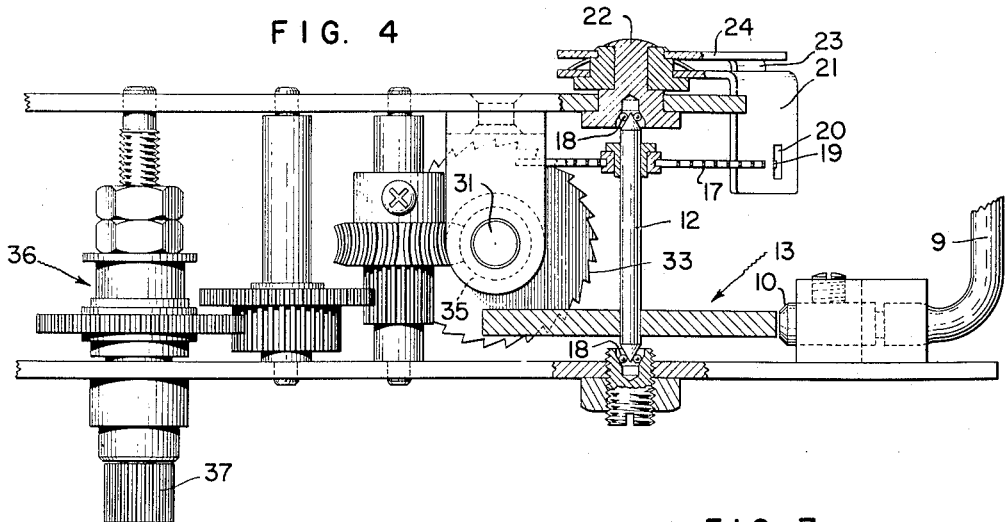
Fig. 4 is a vertical cross section substantially on lines 4—4 of Fig. 2 as viewed in the direction of the arrows.

Referring to Fig. 4, it will be seen that shaft 12 has conical ends which are pivotally mounted in ball bearings 18. The inner end of spring 17 is attached to shaft 12, The outer or free end 19 of spring 17 is frictionally held in a slot 20 in an L-shaped strip 21, which is pivotally mounted on a stud 22, and in a slot in a depending arm 23 of a second flat strip 24, also mounted on stud 22. By rotating strips 21 and 24 the tension with which spring 17 biases shaft 12 may be adjusted. Valve 13 and spring 17 act in the manner of the ordinary escapement of a clock.

Returning to Fig. 1, diaphragm 7 is clamped by means of screw 25 and head 26 to a shaft 27. Spring 28 biases shaft 27 and diaphragm 7 against the pressure of the air in chamber 6. Shaft 27 carries, at its lower or opposite end from diaphragm 7, a pin 29 which pivotally connects shaft 27 to a pawl-carrier 30 pivoted for rotation about a shaft 31. Pawl-carrier 30 has attached to it a pawl 32 which cooperates with ratchet 33. Ratchet 33 is fastened to shaft 31 and causes shaft 31 to rotate about its axis. Case 4 carries a stationary pawl 34 which also cooperates with ratchet 33.

Figure 3:
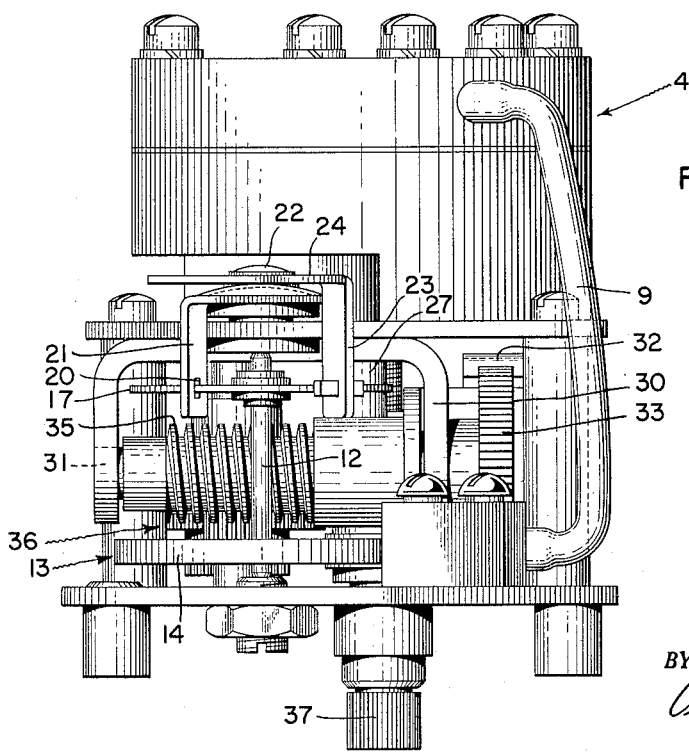
Fig. 3 is a side elevation.

Figs. 2 and 3 show that shaft 31 has a worm gear 35 on it which forms the input gear of a train of gearing, generally indicated at 36, and terminating in an output gear formed by pinion 37. Pinion 37 is adapted to mesh with other gearing forming part of the drive for the chart of a recorder.

The operation of this chart driving means is as follows. Filtered, compressed air is supplied to tube 1 from a source F. A. S. and passes through the restriction formed by bore 3 to chamber 6 and thence through tube 9 to bore 11 in nozzle 10. This jet of air issuing from nozzle 10 through the bore 11 strikes second face 15 of valve 13 and sets the valve 13 and shaft 12 into oscillation about the axis of shaft 12. These oscillations are sustained by the jets of air against the second face 15 against the bias supplied by spring 17. Since first face 14 is closer to nozzle 10 than third face 16, the pressure within bore 11 of nozzle 10 and, consequently, within chamber 6, is at a maximum, when face 14 is opposite bore 11, and is at a minimum, when face 16 is opposite bore 11. This results in a series of puffs or pressure pulses in chamber 6. These variations in pressure in chamber 6 move shaft 27 against the bias of spring 28. Such longitudinal movement of shaft 27 rocks pawl-carrier 30 about the axis of shaft 31. This rocking movement of pawl-carrier 30 causes movable pawl 32 to engage and disengage the teeth of ratchet 33 and, consequently, to rotate ratchet 33 and shaft 31 about the axis of shaft 31. Rotation of shaft 31 causes worm gear 35 to turn gear train 36 and consequently to rotate the output gear or pinion 37.

Fig. 5 shows a modified form of chart drive. In this modification, tube 2 leads to restriction 3 which leads to conduit 5. Nut 25 has a frustoconical portion 250 which cooperates with the inner, ring-shaped edge of conduit 5 to form a valve. This valve 5, 250 closes or partially closes off the supply of air to chamber 6, when diaphragm 7 and shaft 27 are urged, under the bias of spring 28, so that chamber 6 has its minimum volume. Valve 5, 250 thus reduces the pressure of the air in chamber 6 on the return part of the cycle. This adds more energy per cycle because the return stroke of diaphragm 7 and shaft 27 is not opposed by as great a pressure as would otherwise be the case. This can also cause a greater difference between the low pressure and the high pressure in chamber 6 and thus give a more definite series of puffs or pulses. Conduit 8 leads to bore 11 passing through nozzle 10. It will be understood that a valve 13 (not shown in Fig. 5) cooperates with the nozzle 10 in the same manner as described above.

Fig. 6 shows another modification designed to insure easy starting. In this modification, the conduit 8 leads from chamber 6 (not shown) to bore 11 through nozzle 10. A third conduit 88 communicates with conduit 8 and contains a valve 89 biased to closed position by a spring 90. On the opposite side of valve 89, conduit 88 communicates with bore 111 through nozzle 100. Valve 13, having faces 14, 15, and 16, cooperates with bore 11 through nozzle 10 in the manner already described. Spring 17 biases valve 13. A vane 112 is attached to valve 13 in such a way that, when the valve 13 is in its normal position of rest, vane 112 is perpendicular to the axis of the jet of air issuing from bore 111 through nozzle 100.

The way in which the modification of Fig. 6 operates to insure easy starting is as follows. When the pressure in conduits 80 and 88 rises, valve 89 opens. This permits a jet of air to escape through bore 111 and to impinge on vane 112 and thus set the valve 13 into oscillation. This oscillation will be sustained as has been previously explained.

Figure 7:
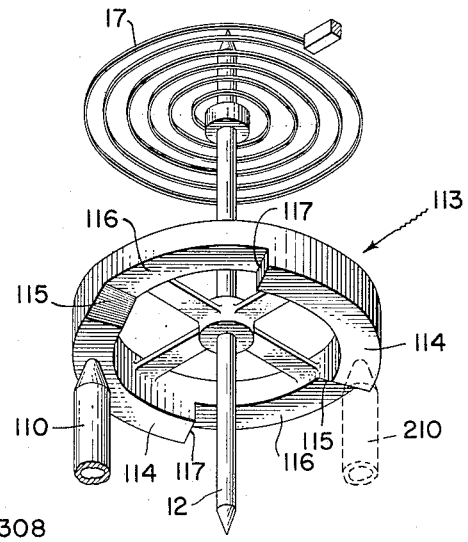
Fig. 7 is a perspective view of a third modification.

Fig. 7 shows that a plurality of nozzles may be employed either with valve 13 of Fig. 1 or valve 113 of Fig. 7. In the modification of Fig. 7, the shaft 12 carries a valve 113 having two first or close faces 114, two sloping or intermediate faces 115, and two third or far faces 116. In addition, valve 113 has two perpendicular faces 117. Nozzles 110 and 210 are located so that their axes are parallel to the axis of shaft 12. A spring 17 biases shaft 12 and valve 113 so that, when the valve 113 is in its normal or rest position, the ends of first faces 114 adjacent second faces 115 overlie the axes of nozzles 110 and 210. The jets of air issuing through nozzles 110 and 210 impinge on the first or close faces 114 and spill over onto the sloping faces 115 and will start the valve 113 into oscillation. This oscillation is sustained with the help of spring 17. This modification reduces friction and allows a weaker spring 17 to be used.

Figure 8:
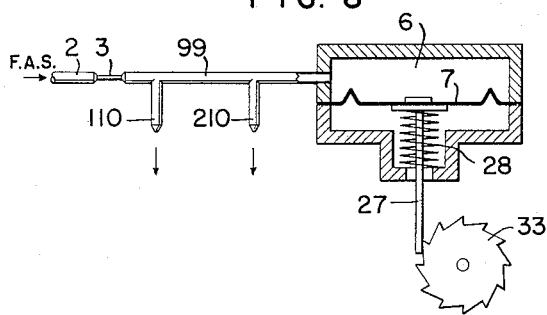
Fig. 8 is a diagrammatic view of one motor with which the modification of Fig. 7 may be employed.

Fig. 8 shows one motor with which the valve 113 of Fig. 7 may be used. In this modification, air from a source F. A. S. is supplied to tube 2 and restriction 3. Tube 99 connects the two nozzles 110 and 210 and the chamber 6 of which the diaphragm 7 forms a movable wall. Shaft 27 is connected to diaphragm 7 and is diagrammatically indicated as bearing directly on the toothed rim of ratchet 33. Valve 113 cooperates with nozzles 110 and 210 in such a way that both nozzles 110 and 210 are uncovered or are covered at the same time. In other words, the nozzles 110 and 210 are operated "in phase" so that both nozzles simultaneously cause a maximum or a minimum pressure in the chamber 6.

Figure 9:
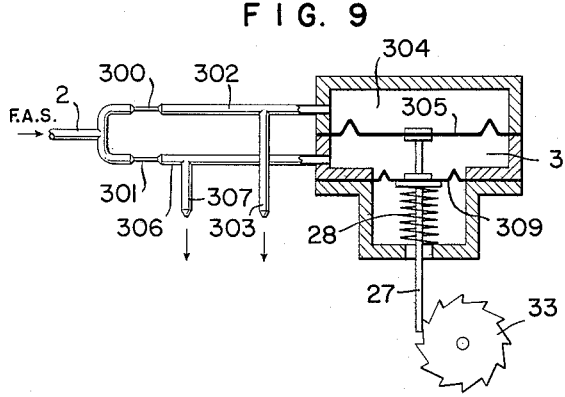
Fig. 9 is a diagrammatic view of another motor with which the modification of Fig. 7 may be employed.

Fig. 9 shows another modification with which the valve 113 of Fig. 7 may be used. In this modification, compressed air from a source F. A. S. is supplied to a tube 2 which branches or forks so as to conduct air to two restrictions 300 and 301. Restriction 300 is connected to pipe 302, to nozzle 303, and chamber 304, of which diaphragm 305 forms one movable wall. Restriction 301 is connected to pipe 306 and nozzle 307 and chamber 308 of which diaphragm 309 forms one movable wall. Shaft 27 is connected to diaphragms 305 and 309. Spring 28 biases diaphragms 305 and 309 in one direction. Shaft 27 is diagrammatically indicated as bearing directly on the toothed rim of ratchet 33. The valve 113 cooperates with nozzles 303 and 307 so that the pressure in one nozzle is at a maximum while the pressure in the other nozzle is simultaneously at a minimum. In other words, nozzles 303 and 307 are operated "out of phase" so that the pressure in chamber 304 is at a minimum when the pressure in chamber 308 is at a maximum and vice versa.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. Means for driving the chart of a recorder, including, a closed passageway, a restriction connected to said passageway and adapted for connection to a supply of compressed air, a nozzle connected through said passageway to said restriction so as to cause a jet of air to issue from said nozzle, an air-operated motor connected through said passageway to said restriction and to the inlet side of said nozzle and actuated by the changes in the pressure of the air in said motor, a valve cooperating with said nozzle and having a first face causing maximum pressure in the air in said motor when said first face is in line with said jet and having a second face which, when in line with said jet, causes said valve to move toward that position in which a third face is in line with said jet and having a third face causing minimum pressure in the air in said motor when said third face is in line with said jet, and means biasing said valve toward that position in which that end of said first face adjacent said second face is in line with said jet, said jet and said means biasing said valve actuate said valve with sustained, regular oscillations between that position in which said first face is in line with said jet and that position in which said third face is in line with said jet.

2. In a recorder, a chart-driving member, pawl and ratchet means to drive said member, a pneumatic motor to drive said pawl relative to said ratchet to rotate the latter, said motor including a case having an inlet connecting to a source of fluid under pressure and an outlet connecting with the atmosphere, a movable wall mounted on said case and defining therewith a chamber connected to said inlet and to said outlet and expansible in response to pressure pulsations applied to said chamber, a valve mounted for oscillation adjacent said outlet so as to set up pressure pulsations in said chamber and actuated into oscillation by the jet of fluid issuing from said outlet, and means biasing said valve toward that position in which said jet actuates said valve.

3. A drive for the chart of a recorder including a pneumatic motor including, a case having an inlet conduit connecting to a source of fluid under pressure and a nozzle having an outlet connecting with the atmosphere, a movable wall having driving connection with said chart and mounted on said case and defining therewith a chamber connected to said inlet conduit and to said nozzle and expansible in response to changes in the pressure exerted by the fluid within said chamber, a spring biasing said movable wall against the pressure exerted by the fluid in said chamber, a valve pivoted adjacent said nozzle and having a portion adapted to be engaged by the jet of fluid issuing from said nozzle so as to move said valve about its pivot, and means biasing said valve toward that position in which said jet moves said valve, so that said means for biasing said valve causes said valve to oscillate at a constant frequency and causes changes in the pressure exerted by the fluid in said chamber, said changes pulsating at a constant frequency and actuating said movable wall.

4. A constant-speed air-operated motor, including, a restriction having an inlet adapted for connection to a supply of compressed air, a case having in it a variable-area chamber connected to the outlet from said restriction, a movable output member forming a wall of said chamber, a spring biasing said output member against the pressure of the fluid within said chamber, a nozzle communicating on one side with the outlet from said restriction and with said chamber and communicating on the other side with the atmosphere, first means set in oscillation by the jet of air issuing from said nozzle and oscillating relative to said nozzle at a constant rate and causing changes in the pressure of the air in said chamber which changes oscillate at a constant rate and move said output member, and second means biasing said first means toward that position in which said first means is started by said jet, said second means sustaining said oscillations.

5. In a recorder, a chart driving mechanism including, a conduit having an inlet adapted for connection to a supply of compressed air, an air-operated motor connected to said conduit and comprising a chamber and a movable output member, a first valve connected to said output member and adapted to control the flow of air from said conduit to said motor, a nozzle connected to the opposite side of said first valve and to said motor, a second valve movable adjacent the output side of said nozzle so as to receive a jet of air from said nozzle, and a spring biasing said second valve toward that position in which it is engaged by said jet of air so that said second valve oscillates at a constant rate and causes pulsations in said chamber of said motor to actuate said output member and said first valve at a constant rate.

6. A chart drive for a recorder including, a restriction adapted for connection to a supply of compressed air, an air-operated motor comprising a chamber connected to said restriction and a movable output member, a first nozzle connected to said chamber, a second nozzle connected to said chamber, a valve movably mounted adjacent said first nozzle, a vane connected to said valve and adapted to receive a jet of air from said second nozzle and actuated by said jet of air to set said valve into oscillation, and a spring biasing said valve and said vane toward that position in which said vane receives the maximum impact of said jet of air, whereby said valve oscillates at a constant rate relative to said first nozzle and causes pressure pulses at a constant rate in said chamber, thereby actuating said output member at a constant rate.

7. A self-starting, constant-speed, air-operated motor, including, a closed passageway, a restriction connected to said passageway and adapted for connection to a supply of compressed air, an air-operated motor connected to said restriction and having a chamber and a movable output member forming a wall of said chamber, a plurality of nozzles connected through said passageway to said chamber and each expelling a jet of air to the atmosphere, a valve cooperating with said nozzles and having a number of first faces each causing maximum pressure in the air in said chamber when said first face is in line with one of said jets and having a plurality of second faces each of which, when in line with said jet, causes said valve to move toward that position in which one of third faces is in line with said jet and having a plurality of third faces each causing a minimum pressure in the air in said chamber when said third face is in line with said jet, and means biasing said valve toward that position in which that end of each of said first faces which is adjacent that second face adjacent said first face is in line with one of said jets, whereby said valve oscillates at a constant rate relative to said nozzle and causes pulses in the pressure in the air in said chamber at a constant rate.

8. Means for driving the chart of a recorder, including, a pair of closed passageways, a plurality of restrictions each connected to one of said passageways and adapted for connection to a supply of compressed air, a plurality of nozzles each connected through one of said passageways to one of said restrictions so as to cause a jet of air to issue from said nozzle, a self-starting, air-operated motor including a pair of chambers each connected through one of said passageways to one of said restrictions and to one of said nozzles and including a movable output member forming a wall of each of said chambers, a valve pivotally mounted adjacent said nozzles and having a plurality of faces each adapted to set said valve in oscillation when said face is engaged by the jet of air issuing from one of said nozzles, and a spring biasing said valve toward that position in which it is set in oscillation by said jets and causing said valve to oscillate at a constant rate, thereby causing constant pulsations in the air pressure in said chambers and actuating said output member at a constant rate.

9. An air-operated, self-starting, constant-output-speed, chart drive, including, a closed passageway, a restriction connected to said passageway and adapted for connection to a supply of compressed air, a nozzle connected through said passageway to said restriction so as to cause a jet of air to issue from said nozzle, an air-operated motor connected through said passageway to said restriction and to the inlet side of said nozzle and actuated by the changes in the pressure of the air in said motor, said motor comprising a chamber, a diaphragm forming a movable wall of said chamber, a spring biasing said diaphragm against the pressure of the air in said chamber, a first pawl pivotally mounted and mechanically connected to said diaphragm so as to be oscillated by movements to said diaphragm, a ratchet pivotally mounted so as to be rotated step by step by movements of said first pawl, a second, stationary pawl engaging said ratchet and holding it against reverse movement, a valve cooperating with said nozzle and comprising a pivotally mounted disc having a first face close to said nozzle so as to cause maximum pressure in the air in said motor when said first face is in line with said jet and having a second face, which slopes at an angle to the axis of said jet and which, when said second face is in line with said jet, causes said valve to move toward that position in which that end of a third face adjacent said second face is in line with said jet and having a third face remote from said nozzle and causing minimum pressure in the air in said motor when said third face is in line with said jet, and a spirally coiled hair spring biasing said valve toward that position in which that end of said first face adjacent said second face is in line with said jet, said jet and said hair spring causing said valve to oscillate at regular time intervals.

References Cited in the file of this patent

UNITED STATES PATENTS

| | | |
|---|---|---|
| 1,985,589 | Meer | Dec. 25, 1934 |
| 2,181,120 | Dake | Nov. 28, 1939 |
| 2,333,044 | Rosch | Oct. 26, 1943 |